United States Patent Office 3,248,354
Patented Apr. 26, 1966

3,248,354
AQUEOUS VINYL ESTER BASE PAINTS CONTAINING ZINC FLUORIDE SALTS
Vera M. Birten, Springfield, Mass., assignor, by mesne assignments, to Monsanto Company, a corporation of Delaware
No Drawing. Filed Dec. 18, 1961, Ser. No. 160,292
4 Claims. (Cl. 260—29.6)

This is a continuation-in-part of S.N. 797,049 filed March 4, 1959, now abandoned.

This invention pertains to modified compositions of aqueous vinyl ester base paints effective to prevent "lime-burning" on masonry and to the method of preparing such compositions.

The migration of lime deposits, which deposits generally consist of calcium oxide and calcium hydroxide, to the exterior surface of a paint film applied on masonry surfaces is known in the art as "lime-burning." These deposits originate from excess or unreacted lime contained in cementitious materials found in masonry and the deposits will completely permeate the air-dried film of an aqueous polymer base paint covering the masonry substrate. The effects of "lime-burning" on the paint film are visual effects comprising, generally, fading, non-uniformity, and spotting in the coloration of the paint film. That the lime deposits have completely permeated the paint film where "lime-burning" has occurred and are present on the exterior surface of the film can be adduced from the action of dilute hydrochloric acid placed on the paint surface. Upon so doing, there is an immediate evolution of bubbles indicating the formation of carbon dioxide resulting from the reaction of the acid with the lime deposits which are present.

The type of masonry which can give rise to "lime-burning" can generally be characterized as that containing lime, hydrated lime and like products as starting materials or such active precursor substances which form these products during the curing or aging process of the masonry. Typical masonry materials which contain such products include the cementitious compositions generally, for example, concrete, lime mortar, stucco, asbestos cement shingles, and the like as well as plaster compositions (e.g. plaster of Paris). The "lime-burning" effect is most generally found in freshly cured applications of such materials where the composition is still "lime rich" as a result of excess and/or unreacted lime deposits. The problem, however, is by no means restricted to the fresh uncured materials since the effect has also been noted in aged materials having such an excess of lime and lime deposits that even after a full curing some of the deposits remain.

Various methods have been employed to eliminate the migration of lime deposits to the exterior of a painted surface. For example, U.S. Patent 2,750,302 teaches controlling the "blooming" of asbestos cement shingles by coating such with a polyethylene composition. Such a precoating, however, is expensive and may also give poor adhesion to any subsequent coating. In U.S. Patent 2,702,284 it is taught that "blooming" of surfaces may be controlled by painting such with aqueous polymer dispersion paints having incorporated therein barium compounds. That blooming differs from "lime-burning" can be deduced from the fact that the barium compounds used for the preventin of blooming will not prevent the "lime-burning" phenomenon. That blooming is not "lime-burning" can also be shown from the fact that blooming occurs in the painted surfaces whether or not the paint has been applied over cementitious material or some other material such as wood. This can be shown from the absence of any reference in the cited patent of the application of the dispersion paint to a cementitious surface.

Still another method has been employed to prevent the migration of lime deposits to the exterior surface of painted masonry surfaces by priming the unpainted masonry surface with an aqueous solution of $ZnSiF_6$. This method adds an extra step to the painting of such surfaces, hence makes the method economically undesirable.

The present invention provides aqueous polymer base paints that prevent the occurrence of "lime-burning" on the exterior surfaces of cementitious materials painted with aqueous polymer base paints. Another important object of the present invention is to provide improved aqueous mixtures containing the polymer for the production of aqueous polymer base paints. Still another important object is to provide a method for the preparation of the improved products of the present invention. These and other objects will be apparent from the following examples and subsequent discussion thereon.

Paints according to the invention can be made by admixing with the paint a fluoride compound having the following structural formula:

$$XA$$

where X is a cation which will be replaced by the calcium ion and A is an anion which can be selected from the group consisting of silicofluorides and fluorides, which replacement product forms a relatively water-insoluble salt. Both of the above mentioned type fluoride compounds may generally be added to the aqueous mixture containing the polymer from which the paint is derived. The salts, moreover, may be added to the pigment slurry or paint base as well. The addition of the fluoride compound may be made as an aqueous solution as well as in dry powder form. When dilution of the product is to be avoided, it is preferred to use the latter form. Hydrated forms of the particular salts are utilizable.

The aqueous polymer base paints which are benefited by the practice of the present invention can be selected from the general class of paints which are prepared from water-diffusible polyvinyl ester bases.

The form of the polymers from which the aqueous polymer base paints can be prepared, therefore, include an aqueous mixture of the polymer either dispersed or in solution, and the dry solid form of the polymer, such as those prepared by the method taught in U.S. Patent 2,800,-463, the disclosure of which is hereby incorporated by reference.

The aqueous polymer base paints which can be benefited by the practice of the present invention are those prepared from vinyl ester polymers. It is to be understood that there are many modifications of the above type of polymers that may be successfully employed. For example, it will be shown that not only base paints comprising water-dispersible vinyl ester homopolymers but also copolymers of vinyl esters can be benefited by incorporation of the fluorine salts.

Water soluble fluorine-containing salts may be incorporated into the paints at various stages of their formulation; they may be mixed to the aqueous polymer mixture, the paint base, the pigment slurry, or the final paint. More sparingly water-soluble fluorine compounds may be used to compensate for oversensitivity of the aqueous polymer mixture where such sensitivity might cause precipitation of the polymer were a more soluble fluorine salt used, dispersions of these salts can be added directly to the aqueous mixture containing the polymer or to the paint base, pigment slurry or final paint, thereby avoiding the criticality of the addition to such paints.

The present invention is practiced in its preferred embodiment as illustrated in the following examples but is not limited thereto:

*Example 1.—Addition of the fluoride salt to the paint*

16 gms. of a 25% by weight aqueous solution of zinc silicofluoride hexahydrate ($ZnSiF_6 \cdot 6H_2O$) were added directly to 100 gms. of a polyvinyl acetate dispersion paint at room temperature with low speed agitation for 10 minutes. The paint had the following composition:

| Constituent— | Parts by weight |
|---|---|
| Plasticizer: | |
| Dibutyl phthalate | 24 |
| Solvents: | |
| Hexylene glycol | 15 |
| Ethylene glycol | 20 |
| Binder: | |
| 55% total solids aqueous emulsion of polyvinyl acetate | 330 |
| Wetting agent: | |
| 10% aqueous solution of the sodium salt of carboxylated polyelectrolyte | 14 |
| Thickener: | |
| 3% aqueous solution of methylcellulose, 1500 cps. viscosity | 100 |
| Pigment: | |
| Titanium dioxide | 150 |
| Pigment extenders: | |
| Aluminous clay | 60 |
| Mica | 40 |
| Dispersing agent: | |
| Copolymer of ethylene oxide with the condensation product of propylene oxide with propylene glycol | 1 |
| Water | 216 |
| | 970 |

The resulting admixture was a uniformly dispersed smooth stable product. When a sample of the admixture was applied to the surface of a freshly cured plaster of Paris sample and allowed to dry, the exterior surface of the painted film had a uniform color with no fading. By contrast, when such lime rich, freshly cured plaster of Paris surface was coated with the same paint composition but not containing the zinc silicofluoride ($ZnSiF_6 \cdot 6H_2O$), the exterior surface quickly developed spots of deeper color together with areas of fading.

Another test was performed which illustrated the differences existing between lime rich surfaces painted with the admixture of the present invention and those painted with non-modified dispersion paints. When a few drops of diluted HCl were applied to the same painted surfaces prepared above, the admixture painted surface remained unaffected whereas the non-modified dispersion paint surface developed bubbles.

*Example 2*

The additives of the present invention can also be incorporated directly into the dispersion paint in dry form as distinct from aqueous solutions thereof, where the particular additive used is water soluble and it is desired not to dilute the paint composition. For example, 4 gms. of dry $ZnSiF_6 \cdot 6H_2O$ were mixed with 100 gms. of the same dispersion paint as described in Example 1, at room temperature and with moderate mechanical agitation. The resulting admixture had a smooth, non-grainy appearance. When tested according to the same procedure as used in Example 1, the film samples of the dispersion paint containing the fluoride salt exhibited a uniform color appearance and did not fade or bubble, as distinct from the development of many spots in the non-modified paint film.

The fluoride salts of the present invention may be added to the paint base, the aqueous mixture of the polymer contained in the paint base, or added to the pigment slurry as well as to the paint itself. Incorporation of these additives is beneficial to aqueous polymer base paints containing copolymers of vinyl acetate for the resinous binder as well as for such paints based on vinyl acetate homopolymers. This will be apparent from Examples 3 to 5.

*Example 3*

A mixture was prepared comprising 34 parts of zinc fluoride hydrate with 15 parts of a 10% solution of the sodium salt of carboxylated polyelectrolyte together with 15 parts of water. This mixture was stirred into 409 parts of the paint base of a dispersion paint having the following formulation:

PAINT BASE

| Constituent— | Parts by weight |
|---|---|
| Solvent: | |
| Hexylene glycol | 15 |
| Ethylene glycol | 20 |
| Binder: | |
| 55% total solids aqueous emulsion of the copolymer comprising 75 parts by weight of vinyl acetate with 25 parts by weight of dibutyl maleate | 374 |
| | 409 |

PIGMENT SLURRY

| Constituent— | |
|---|---|
| Water | 42 |
| Wetting agent: | |
| 10% aqueous solution of the sodium salt of carboxylated polyelectrolyte | 20 |
| Thickener: | |
| 3% aqueous solution of methyl cellulose, 1500 cps. viscosity | 200 |
| Pigment: | |
| Titanium dioxide (water dispersible type) | 50 |
| Pigment extenders: | |
| Aluminous clay | 100 |
| Mica | 40 |
| Chromic oxide (colored pigment grade) | 43 |
| Dispersing agent: | |
| Copolymer of ethylene oxide with the condensation product of propylene oxide with propylene glycol | 2 |
| | 497 |

When tested the admixture paint did not fade nor were any bubbles formed with the dilute hydrochloric acid test. On the other hand, the unmodified paint showed color fading together with spots of color and non-uniformity and furthermore, bubbles were formed when a drop of diluted hydrochloric acid was added to the paint film.

*Example 4*

To 374 parts of an aqueous emulsion of the copolymer of vinyl acetate with dibutyl maleate was added 130 parts of a mixture comprising 23 parts of $ZnSiF_6 \cdot 6H_2O$, 12 parts of the sodium salt of carboxylated polyelectrolyte and 95 parts of water. To the first mixture was added a second mixture comprising 15 parts of hexylene glycol and 20 parts of ethylene glycol. To the admixture was added 454 parts of the same composition slurry as shown in Example 3.

The paint test over lime rich freshly cured plaster resulted in uniform color and no bubbles for the above modified dispersion paint composition.

Example 5

To 863 parts of the unmodified dispersion paint having the same composition as shown in Example 3 was added 34 parts of a saturated aqueous solution of $ZnSiF_6 \cdot 6H_2O$.

The modified paint applied on a freshly cured surface showed no fading or bubbling. The unmodified paint when so applied resulted in color fading and color non-uniformity together with the formation of bubbles when a drop of diluted hydrochloric acid had been added to the paint surface.

Examples 6-9 illustrate that not only fluorine salts other than zinc may be used in the practice of this invention, but also that aqueous dispersions of such salts may be employed, as well as solutions, where such latter salts are more sparingly water-soluble. In Example 6, the fluorine salt was added to the aqueous resin binder emulsion (52% total solids) of the paint, such resin binder comprising a copolymer consisting of 75% by weight with 25% by weight of dibutyl fumarate. In Examples 7-9, the fluorine salt was added directly to the paint.

Examples 6-9

| Ex. No. | Salt addition | How salt added | Parts salt/100 parts emulsion | Parts salt/100 parts paint | Graininess of film | Fading | Uniformity | Bubbles |
|---|---|---|---|---|---|---|---|---|
| 6 | $ZnF_2$ | As a 43% aqueous dispersion containing 10% sodium salt of carboxylated polyelectrolyte added to the emulsion. | 6.0 | | Slightly grainy. | None | Relatively uniform | Some. |
| 7 | $Na_2SiF_6$ | As a 50% aqueous dispersion containing 10% sodium salt of carboxylated polyelectrolyte added to the paint. | | 5 | Not grainy | do | Uniform | Few. |
| 8 | LiF | As 50% aqueous dispersion containing 10% sodium salt of carboxylated polyelectrolyte added to the paint. | | 10 | do | do | do | Some. |
| 9 | $BaF_2$ (Control) | As 33% aqueous dispersion containing 10% sodium salt of carboxylated polyelectrolyte added to the paint. | | 5 | do | Faded | Not uniform | Many. |

As will be seen from Examples 6 to 9, the results of substituting salts other than $ZnSiF_6 \cdot 6H_2O$ are not as beneficial as adding the latter compound. Still, all the paint films containing these additives were relatively uniform in coloration. Note however that barium fluoride is unsatisfactory.

For the purposes of illustrating the preferred embodiment of the present invention in all of the above examples, freshly cured plaster was shown as a typical substrate material having a lime rich surface. The samples of freshly cured plaster still contained approximately 30% by weight of water when painted and tested. But, as has been said previously, painting of fully cured masonry surfaces may also be benefited by the compositions of the present invention where the masonry still contains an unreacted mobile CaO and $Ca(OH)_2$. It therefore follows that the class of masonry surfaces which can be benefited by the present compositions is that which can be characterized generally as "lime rich" and more specifically, as that masonry still having present migratory CaO or $Ca(OH)_2$ deposits.

The class of aqueous polymer base paints which may be modified by the incorporation therein of fluoride salts may be characterized as an aqueous mixture of a resinous binder, a pigment or extender, and a surfactant. The class of useful paints may be further characterized as those wherein the particle size of the solids contained therein is generally below 6 micron diameter. The resinous binder may be internally plasticized as shown in Example 3 above or may be post-plasticized by the incorporation of a plasticizer in the paint as shown in Example 1. Various organic liquid solvents may also be incorporated in the paint composition for their fugitive plasticizing effect on the resinous binder, as was shown in Example 1. The type of surfactants incorporated in the paint composition generally include both wetting agents and dispersants as was illustrated in the preceding examples. A more specific characterization of the useful paints for the practice of this invention can be made in terms of the resin binder itself.

The resin binder of useful paints is preferably a polyvinyl ester resin, as mentioned earlier. Included in this class are homopolymers of vinyl acetate, vinyl propionate, vinyl butyrate, vinyl hexoate, vinyl benzoate, and the like, as well as copolymers of vinyl esters with mono-ethylenically unsaturated monomers copolymerizable therewith, including other vinyl esters; lower alkyl esters of acrylic acid such as methyl, propyl, hexyl, octyl, ethylhexyl acrylates and others; lower alkyl esters of methacrylic acid such as methyl, ethyl, propyl, butyl, hexyl, octyl, ethylhexyl methacrylates and the like; lower alkyl esters of dicarboxylic acids of the maleic and fumaric type, such as dibutyl maleate, dibutyl fumarate and so on. In addition to the constituents for aqueous polymer base paints already described, many other additives may be incorporated in such paints where the particular application for the paint may so require. For example, many such paints contain thickeners, anti-foaming agents, fire retardants, water-proofing agents, fungicides, bactericides, and dispersed dye agents. It is intended therefore not to limit the practice of the present invention to the particular paint compositions heretofore disclosed in the above examples.

Nor is it intended to limit the invention merely to the incorporation of the fluoride salt in the paint. As has been demonstrated, the additive may be successfully incorporated into the various component parts of a paint, namely the aqueous mixture of the resin binder component of the paint base, the paint base itself or the pigment slurry. The named components are well known in the art and commercial aqueous polymer base paints are generally prepared by first formulating these mixtures separately and subsequently combining them to obtain the paint. Useful paint bases and pigment slurries are taught in U.S. Patent 2,601,315 along with suitable methods of preparation, especially in Example 2 of the reference, wherein Part A corresponds to an emulsion form of the aqueous mixture of the resin binder component, Part B corresponds to the solvent-plasticizer mixture which when combined with Part A becomes the paint base, and Part C corresponds to the pigment slurry.

The preparation of the resin binders which characterize the aqueous polymer base paints useful in the practice of this invention is well known. For example, preparation of a suitable polyvinyl acetate binder in solid form has already been disclosed as according to the method taught in U.S. Patent 2,800,463. Other methods suitable for the preparation of resin binders useful in the practice of the present invention include those shown in U.S. Patent 2,614,088, U.S. Patent 2,444,396 and others.

The preferred amount of fluoride salt for incorporation in the aqueous polymer base paints ranges from that sufficient to provide 1.8 parts of silicofluoride ion per 100 parts of the aqueous resin binder mixture to 3.6 parts of silicofluoride ion per 100 parts of the aqueous resin binder mixture. Where fluorides are used as distinct from silicofluorides, the preferred range is an amount sufficient to provide 5.4 parts of fluoride ion per 100 parts of the aqueous resin binder mixture to 13.6 parts of fluoride ion per 100 parts of the aqueous resin binder mixture. As little as 0.9 part silicofluoride ion per 100 parts of the aqueous resin mixture or 1.7 parts of fluoride ion per 100 parts of the aqueous resin binder mixture, however, is adequate to impart remarkable improvement to the paint films on lime rich masonry surfaces and continued improvement has been found where the fluoride salt concentrations have been as much as 4.5 parts of silicofluoride ion per 100 parts of the aqueous resin binder mixture or 17.0 parts of fluoride ion per 100 parts of the aqueous resin binder mixture. It is obvious that mixtures of fluorides and/or silicofluoride salts may be incorporated in the suitable manner prescribed heretofore.

Other fluorine salts useful for the practice of this invention in addition to those already disclosed in the examples may be selected from the class of calcium reactive, metallic fluorides and silicofluorides that are sufficiently water-soluble to provide the minimum concentrations of silicofluoride and fluoride ions just recommended. By calium reactive is meant the ability of the salt to withdraw calcium oxide from the cementitious surface by converting that compound into the water-insoluble calcium fluosilicate and/or calcium fluoride as the case may be. Examples of such fluorine salts are lithium and potassium fluorides, sodium fluosilicate, magnesium fluosilicate hexahydrate and so on.

Generally speaking, any of the normal paint grade types of pigment may be employed. Preferably, pigments should be selected which are most readily dispersed in water with the aid of a dispersing agent. For paints it is usual to employ both prime pigments and extenders. It is preferred that the dry type of extender be employed, for example, as the mica extender used in Example 1. It was found that the dry ground mica was better than the wet ground type. The invention is not limited to any particular surfactant employed in the aqueous polymer base paint, since all such agents which will disperse the pigment and/or extenders are useful. The use of surfactants in aqueous polymer base paints is well known and suitable agents may be selected from the broad class of anionic, cationic, and non-ionic types. It is furthermore believed that range of amounts of the above constituents in the aqueous polymer base paint is not critical for the successful practice of the present invention, although commercial practice limits the total solids in such paints to 50–60% total solids.

The word, "stable," as defining paint compositions in this specification and the claims denotes the absence of precipitation, coagulation, and non-redispersibility of the polymer base in the paint. Such effects are distinct from a mere soft settling of the paint constituents, particularly for the dispersion type paints, which is the usual occurrence during storage of this type paint over extensive periods. The precipitation, coagulation, and non-redispersibility which do occur in unstable compositions, are irreversible in nature, whereas when soft settling has occurred, redispersion may be effected merely by simple hand mixing.

What is claimed is:

1. A stable aqueous resin binder mixture paint comprising a vinyl ester polymer as the resin binder and the hexahydrate of zinc fluosilicate in an amount sufficient to provide 0.9–4.5 parts of fluosilicate ion per 100 parts of aqueous resin binder mixture, all parts being by weight, said vinyl ester polymer being selected from the group consisting of the homopolymers of vinyl esters and the copolymers of said esters with polymerizable ethylenically unsaturated carboxylic acids and derivatives thereof.

2. The paint of claim 1 wherein the resin binder is polyvinyl acetate.

3. A stable aqueous resin binder mixture paint comprising a vinyl ester polymer as the resin binder and the hexahydrate of zinc fluosilicate in an amount sufficient to provide 1.8–3.6 parts of fluosilicate ion per 100 parts of aqueous resin binder mixture, all parts being by weight, said vinyl ester polymer being selected from the group consisting of the homopolymers of vinyl esters and the copolymers of said esters wth polymerizable ethylenically unsaturated carboxylic acids and derivatives thereof.

4. The paint of claim 3 wherein the resin binder is polyvinyl acetate.

References Cited by the Examiner
UNITED STATES PATENTS

| | | | |
|---|---|---|---|
| 2,702,284 | 2/1955 | Brock | 260—29.7 |
| 2,709,689 | 5/1955 | Herzog | 260—8 |
| 2,886,546 | 5/1959 | Dilbert et al. | 260—29.6 |

MURRAY TILLMAN, *Primary Examiner.*

LEON J. BERCOVITZ, *Examiner.*